Jan. 4, 1955        J. O. JARNO        2,698,477

HOB

Original Filed Dec. 11, 1947

INVENTOR.
John O. Jarno,
BY
Harness, Dickey & Pierce.
ATTORNEYS.

United States Patent Office 2,698,477
Patented Jan. 4, 1955

2,698,477
HOB

John O. Jarno, Royal Oak, Mich., assignor to Michigan Tool Company, Detroit, Mich., a corporation of Delaware Continuation of abandoned application Serial No. 791,040, December 11, 1947. This application December 31, 1952, Serial No. 328,960

1 Claim. (Cl. 29—103)

This invention relates generally to hobs for cutting gear teeth and more particularly to an improved protuberance-type hob.

In the production of highly accurate gears, one of the present practices is to first preshave or rough hob the gear teeth on a generating machine. Due to the inherent characteristics of such generating machines, including accumulating errors in gear trains, lead screws, bearings, improper mounting of generating tools, etc., limits are established beyond which the generating process cannot effectively go with increasing accuracy. In addition to the errors involved in the cutting operation itself, unavoidable variations in grain structure, in the gear blanks and in materials, add to the difficulties in the direction of further increase in uniformity of accuracy of the final product. The hob of the present invention is particularly adapted for use in preshaving gears in preparation to their being finished, prior to heat treatment, by means of, for example, a serrated rotary shaving tool. Such a shaving tool is used in a cross-axis shaving process to finish the gears within close tolerances in a relatively inexpensive manner.

When the rotary shaving tool is advanced into the interdental spaces between the gear teeth so as to shave the flanks of the latter, difficulties have been encountered in that the edges of the shaving tool often become dulled or break due to an interference point in the flank of each gear tooth, adjacent the root thereof. In order to relieve this interference point, preshaving hobs are generally provided with a protuberance adjacent the outer end of the cutting teeth flanks. These protuberances have generally been formed in a more or less bulb shape. Therefore this type of protuberance, when it relieves the interference point in the flanks of gear teeth, cuts a generally smoothly rounded recess or undercut in the gear teeth flanks. The smoothly rounded shape of this undercut is important because it results in a final product where the hobbed undercut portion will join with the shaved gear flank in a relatively smooth blended surface. The spacing and width of the gear teeth vary slightly because of variances in the hobs due to wear from use, variances in the mounting of the hob, etc. Due to these variances, when the rotary cutter is forced between the gear teeth, so as to shave the same, the peripheral edges thereof, under certain conditions, may engage the bottom faces of the semicircular recesses and cause the rotary cutter to chip or break. These bulb-type protuberances on the hob flanks also have a tendency to break or chip during the hobbing operation.

It is therefore an object of this invention to provide a preshaving hob having protuberances on the flanks of its teeth, which are so formed as to be especially strong and durable and thereby provide a longer lasting hob.

It is a further object of this invention to provide a protuberance hob of the aforementioned type in which the protuberances on the flanks of the cutting teeth are formed by generally flat portions which extend longitudinally outwardly and obliquely away from the flanks, and flat portions which extend outwardly from the oblique protuberance portions parallel to the flanks and are blended into the ends of the cutting teeth by radiuses, whereby to form recesses in the gear teeth, adjacent the root thereof, which will be elongated in comparison to the recesses formed by the bulb-type protuberances and which therefore permit the peripheral edges of the rotary shaving tool to be free from contact with the gear flanks regardless of any variations in the tooth spacing, thickness, etc. At the same time the undercut area is of such a shape and configuration that it blends smoothly with the shaved surface of the flank of the gear tooth thereby eliminating any step or other sharp corner or recess.

Other objects of this invention will become apparent from the following detailed description taken in conjunction with the accompanying drawing in which.

Figure 1:
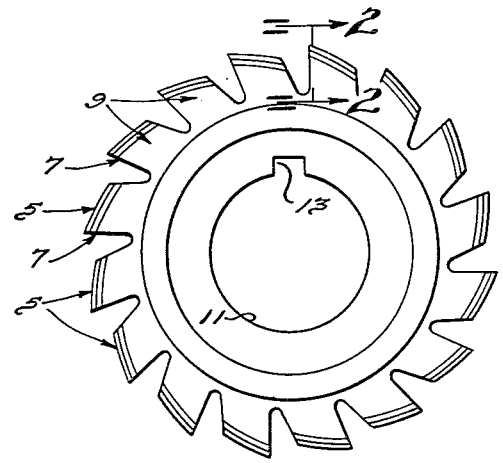
Figure 1 is a side elevational view of a hob of this invention.

Referring now to the drawing it will be seen that the hob illustrated is of the preshave type comprising an annular body 3 with an outer periphery having at least one row of circumferentially spaced cutting teeth 5 formed with front cutting faces 7 and rear faces 8 and also with opposed side faces or flanks 9. The hob is provided with a central opening 11 and a keyway 13 for attachment to a hob spindle (not shown).

Figure 2:
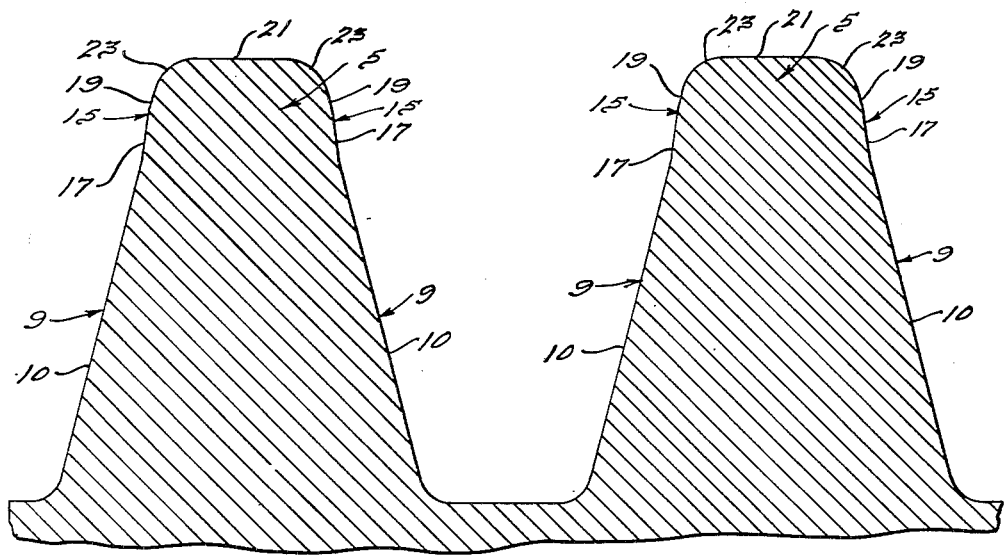
Figure 2 is an enlarged sectional view of the structure illustrated in Fig. 1 taken along the line 2—2 thereof.

As can be seen in Fig. 2 each hob tooth 5 is substantially identical, and its flanks 9 are formed with flat lower or inner portions 10 which converge outwardly and are disposed on a predetermined pressure angle. The upper portion of each flank 9 is formed with a protuberance, generally indicated at 15. Each protuberance 15 is formed by means of a lower or inner portion 17 which blends into, and extends upwardly or outwardly from flank portion 10, obliquely away therefrom so that the included angle between the converging surfaces 17 is slightly less (as illustrated) than the included angle between surfaces 9. A flat 19 blends into, and extends outwardly from the outer end of the oblique portion 17. The flat portion 19 extends parallel to the flank portion 10 to provide a flat protuberant face. The upper ends of the flats 19 are blended into the outer end 21 of the hob tooth by means of arcuate corners or radiuses 23, it being observed in Fig. 1 that the surfaces 21 extend on a downward incline (i. e. reducing radius) from the front faces 7 to the rear faces 8. A protuberance is obtained which will relieve interference points of the gear teeth flanks by means of elongated recesses instead of the semicircular recesses formed by the bulb-type protuberances. It will be noted that the oblique protuberant portion 17 is of a substantial length and extends obliquely away from the flank portion 10 on a relatively small angle and that the flat portion 19 is substantially short in length in comparison with the oblique portion 17. Thus the protuberance 15 herein illustrated is especially strong and due to the relation between its overall length and its output protrusion, it will withstand working shocks and loads in a better manner than the bulb-type protrusion. The protuberances of the hob of this invention will also, as pointed out above, relieve the interference points of the gear teeth flanks in a better manner so as to permit the peripheral edges of the cutting teeth of the rotary shaving tool to run in space and not engage the gear flank regardless of variable conditions thereof.

I claim:

A protuberance type hob for hobbing gears which are subsequently to be shaved, said hob comprising an annular body formed with radially extending cutting teeth circumferentially spaced from each other about its outer periphery and each having an outer end portion forming a protuberance, each tooth having side faces and front and rear faces and at its outer end having an end face extending at a downward incline from the front face to the rear face, the side faces comprising flanks at opposite sides of the tooth, said flanks having first flat surfaces extending radially outwardly for the major portion of the length of the tooth and disposed in converging relation to each other at the same angle and merging into inner radial ends of second flat surfaces constituting the inner radial portions of the side faces of the protuberance of the said tooth, the said second surfaces extending along a substantial length of the said protuberance and converging toward each other with increasing radius and being disposed at an included angle slightly less than the included angle between the first converging surfaces, the said second surfaces merging into shorter flat third surfaces that extend radially outwardly and parallel to said first surfaces, said third surfaces being connected with opposite side edges of the outer end face of the tooth by rounded corners that merge into the outer ends of said third surfaces and into opposite side edges of the outer end face of the tooth.

References Cited in the file of this patent

UNITED STATES PATENTS

| | | |
|---|---|---|
| 2,125,943 | McMullen et al. | Aug. 9, 1938 |
| 2,268,326 | Stewart et al. | Dec. 30, 1941 |
| 2,270,003 | Head | Jan. 13, 1942 |